April 9, 1940.    G. D. LONGMAN    2,196,636
IMPLEMENT ATTACHMENT
Filed April 17, 1939    2 Sheets-Sheet 1
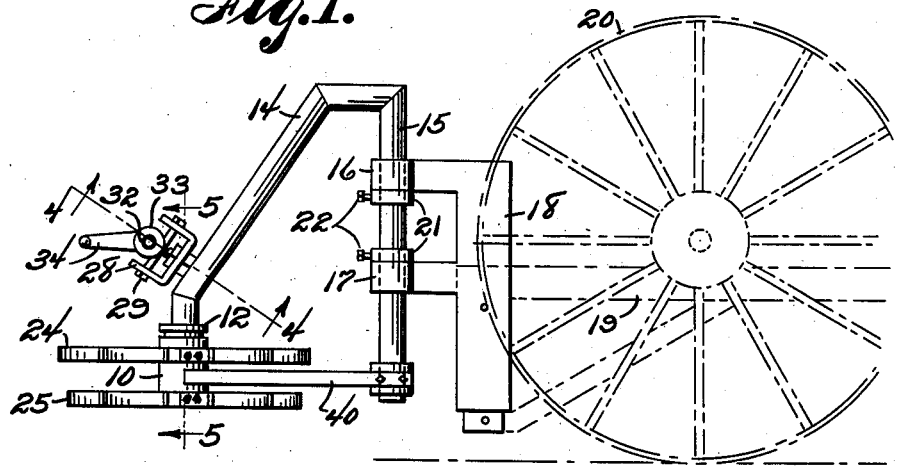
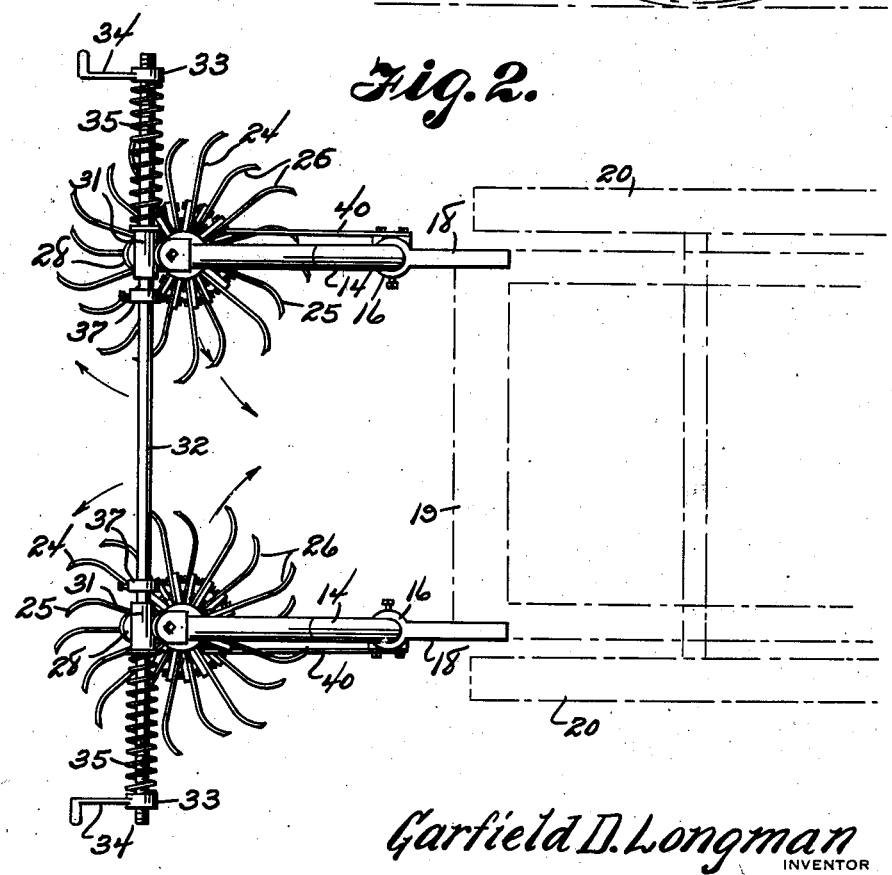
Garfield D. Longman
INVENTOR
BY Victor J. Evans & Co.
ATTORNEYS April 9, 1940.　　G. D. LONGMAN　　2,196,636
IMPLEMENT ATTACHMENT
Filed April 17, 1939　　2 Sheets-Sheet 2
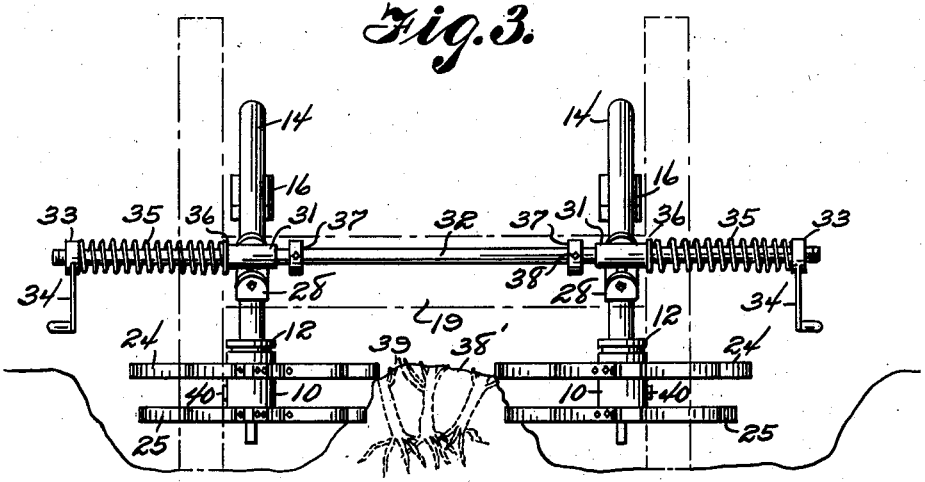
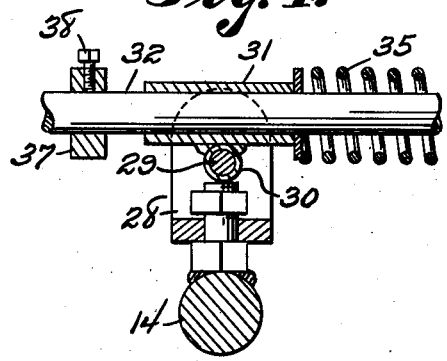
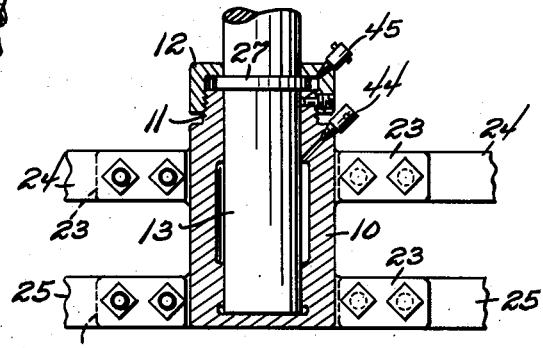
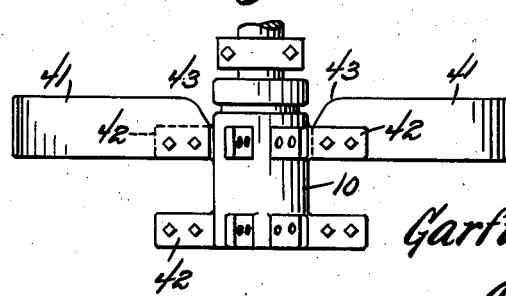
Garfield D. Longman
INVENTOR
BY Victor J. Evans & Co.
ATTORNEYS Patented Apr. 9, 1940

2,196,636

UNITED STATES PATENT OFFICE 2,196,636

IMPLEMENT ATTACHMENT

Garfield D. Longman, Franklin, La.

Application April 17, 1939, Serial No. 268,377

9 Claims. (Cl. 97—179)

The invention relates to an implement attachment and more especially to an attachment for plows or disk cultivators and usable for removal of earth from cane rows, operating as a hoe.

The primary object of the invention is the provision of an attachment of this character, wherein through the use of revolving blades, each of a special formation, enables the removal of earth from the side of the row of growing cane and the placing of the earth removed in the center between the rows of the crop of cane, or, in other words, the attachment when applied to a plow or disk cultivator functions for the barring off of cane and in this way eliminating the hand hoeing of the rows required for the removal of the earth at the sides thereof.

Another object of the invention is the provision of an attachment of this character, wherein the same is mechanical in the working thereof and in this way avoids hand hoeing in the cultivation of growing cane.

A further object of the invention is the provision of an attachment of this character, wherein in the mounting thereof the blades will operate at either or both sides of a row of growing cane and such blades will be maintained clean to avoid clogging in the use of the attachment with a plow or disk cultivator, one working between the rows and the other straddling the rows of the growing crop.

A still further object of the invention is the provision of an attachment of this character, wherein earth will be removed from the crest of a row for plant cane so as to eliminate the stunting of the plants or sprouts and in this manner avoiding hand labor for the loosening and removal of the soil.

A still further object of the invention is the provision of an attachment of this character, which is simple in its construction, thoroughly reliable and efficient in operation, being usable with different types of plows and cultivators, particularly adapted for cane cultivation, and inexpensive to manufacture and install.

With these and other objects in view, the invention consists in the features of construction, combination and arrangement of parts as will be hereinafter more fully described, illustrated in the accompanying drawings, which disclose the preferred and modified forms of embodiment of the invention and pointed out in the claims hereunto appended.

In the accompanying drawings:

Figure 1 is a side elevation of the attachment constructed in accordance with the invention, being associated with a ground working implement.

Figure 2 is a top plan view thereof.

Figure 3 is a rear elevation.

Figure 4 is a sectional view taken on the line 4—4 of Figure 1 looking in the direction of the arrows.

Figure 5 is a sectional view on an enlarged scale taken on the line 5—5 of Figure 1 looking in the direction of the arrows.

Figure 6 is a fragmentary elevation of a modified form of bladed element of the attachment.

Similar reference characters indicate corresponding parts throughout the several views in the drawings.

Referring to the drawings in detail, the attachment comprises one or a pair of bladed elements, each including a hub 10 closed at one end and open at the other, the open end 11 being reduced and externally threaded for the separable attachment of a sand cap 12 thereto. This hub 10 rotatably fits a spindle end 13 perpendicularly disposed and a continuation of an inverted substantially U- or V-shaped hanger 14, the arm 15 thereof is journaled in vertically spaced bearings 16 and 17, respectively. The uppermost bearing 16 is a part of a bracket 18 fixed to the chassis frame, a portion thereof being indicated at 19, of a ground working implement or machine, and the rear wheel of the latter is denoted at 20. This arm 15 of the hanger 14 carries adjustable collars 21 fitted with set screws 22 for the fastening thereof in adjusted position on the arm. The collars 21 sustain the hanger 14 in a vertically adjusted relationship to the bracket 18 fixed to the chassis frame 19 and such hanger is horizontally swingable in the bearings 16 and 17.

The hub 10 has formed at the outer periphery thereof upper and lower spaced radially extending lugs or ears 23 to which are detachably connected outwardly directed upper and lower blades 24 and 25, respectively. These blades at their outer ends are curved at 26 in the same direction to each other and such blades function for removal of earth from the side of a row of planted cane sprouts for the mechanical hoeing rather than necessitating the manual hoeing in the cultivation of the crop.

The spindle end 13 of the hanger 14 is formed with an annular shoulder 27 engaged between the upper open end of the hub 10 and its cap 12 and in this manner the hub is rotatably secured to the spindle end 13 as will be clearly apparent from Figure 5 of the drawings.

On each hanger 14 is pivoted a U-shaped bracket 28 carrying a pivot bolt 29 engaging a pivot collar 30 formed with a bearing sleeve 31 for a tie shaft 32, which is disposed crosswise to the pair of hangers 14 vertically arranged in spaced relation to each other rearwardly of the chassis frame 19 of the member and each supported by the bracket 18, which is fixed to said chassis frame. The shaft 32 has threaded outer ends engaged by adjusting nuts 33, each formed with a hand crank 34, and acts against a coiled tensioning spring 35 about the shaft 32 and outwardly of the sleeve 31 for contact with a washer 36 next thereto and thus tensioning the bladed elements.

On the shaft 32 at the inner side of the sleeves 31 are adjusting collars 37 carrying set screws 38 which secure the said collars to the shaft in their adjusted position and these collars cooperate with the sleeves 31 to limit the inward movement thereof on the said shaft 32.

The blades 24 and 25 in their series rotate in horizontal paths, the blades 25 being of less length than the blades 24 and said blades 25 are staggered relative to the blades 24. The tips or ends 26 of these blades 24 and 25 have a scooping function for removal of dirt from the opposite sides of a row 38' sprouting cane, as at 39, and in this fashion in the advancement of the plow or cultivator having the attachment the crop will be cultivated.

Fixed to the arm 15 of each hanger 14 is a resilient scraper 40 which projects between the upper and lower blades 24 and 25 of the said bladed elements for the removal of clinging earth from the said blades in the working of the attachment and thus avoiding clogging of the elements when in operation.

In Figure 6 of the drawings there is shown a slight modification of bladed element wherein each blade 41 is of greater depth than the lug 42 carrying the same and has the rounded inner upper corner 43 and this blade 41 can be a substitute for either of the blades 24 or 25.

The working position of the bladed elements in the use of the attachment with a plow or cultivator is shown in Figure 3 of the drawings, being illustrative of the relationship of said elements to the row 38' and the sprouts 39 therein.

By adjustment of the nuts 33 through the hand cranks 34 the tension of the springs 35 can be regulated and in the use of the attachment hand hoeing for the cultivation of a growing crop of cane is entirely eliminated in that the working of the bladed elements will mechanically hoe the rows at opposite sides thereof or at one side thereof in the use of a single bladed element and the dirt removed is delivered between the rows on the advancement of the plow or cultivator with the attachment in association therewith.

The hub 10 carries an oil cup 44 and likewise the cap 12 is equipped with an oil cup 45 for lubrication purposes.

What is claimed is:

1. An attachment for an agricultural implement having a wheeled frame, comprising a pair of vertically adjustable and laterally swinging hangers supported at the rear of said frame in spaced vertical relation to each other, horizontally turnable bladed wheels journaled on said hangers, and means coacting with the said hangers for holding the same under tension in an outward direction.

2. An attachment for an agricultural implement having a wheeled frame, comprising a pair of vertically adjustable and laterally swinging hangers supported at the rear of said frame in spaced vertical relation to each other, horizontally turnable bladed wheels journaled on said hangers, means coacting with the said hangers for holding the same under tension in an outward direction, and means for sustaining the hangers against swinging movement.

3. An attachment for an agricultural implement having a wheeled frame, comprising a pair of vertically adjustable and laterally swinging hangers supported at the rear of said frame in spaced vertical relation to each other, horizontally turnable bladed wheels journaled on said hangers, means coacting with the said hangers for holding the same under tension in an outward direction, means for sustaining the hangers against swinging movement, and means for regulating the tensioning means.

4. An attachment for an agricultural implement having a wheeled frame comprising a vertically disposed, horizontally and vertically adjustable hanger arranged rearmost of said frame, and a bladed wheel journaled for horizontal rotation on said hanger and having outwardly curved tips on the blades thereof.

5. An attachment for an agricultural implement having a wheeled frame comprising a vertically disposed, horizontally and vertically adjustable hanger arranged rearmost of said frame, a bladed wheel journaled for horizontal rotation on said hanger and having outwardly curved tips on the blades thereof, and means active for tensioning the hanger in one direction.

6. An attachment for an agricultural implement having a wheeled frame comprising a vertically disposed, horizontally and vertically adjustable hanger arranged rearmost of said frame, a bladed wheel journaled for horizontal rotation on said hanger and having outwardly curved tips on the blades thereof, means active for tensioning the hanger in one direction, and a scraper cooperating with said bladed wheel.

7. An attachment for an agricultural implement having a wheeled frame, comprising a pair of vertically adjustable and laterally swinging hangers supported at the rear of said frame in spaced vertical relation to each other, horizontally turnable bladed wheels journaled on said hangers, means coacting with the said hangers for holding the same under tension in an outward direction, means for sustaining the hangers against swinging movement, means for regulating the tensioning means, and scraper means cooperating with the bladed wheels.

8. An attachment for an agricultural implement having a wheeled frame, comprising a pair of vertically adjustable and laterally swinging hangers supported at the rear of said frame in spaced vertical relation to each other, horizontally turnable bladed wheels journaled on said hangers, means coacting with the said hangers for holding the same under tension in an outward direction, means for sustaining the hangers against swinging movement, means for regulating the tensioning means, scraper means cooperating with the bladed wheels, and curved tips formed on the blades of said wheels.

9. An attachment for an agricultural implement having a wheeled frame, comprising a pair of vertically adjustable and laterally swinging hangers supported at the rear of said frame in spaced vertical relation to each other, horizontally turnable bladed wheels journaled on said hangers, means coacting with the said hangers for holding the same under tension in an outward direction, means for sustaining the hangers against swinging movement, means for regulating the tensioning means, scraper means cooperating with the bladed wheels, curved tips formed on the blades of said wheels, and means coacting with the tensioning means to limit tensioning action in one direction.

GARFIELD D. LONGMAN.